R. W. MAGNA.
BATTERY BOX.
APPLICATION FILED OCT. 1, 1908.

948,111.

Patented Feb. 1, 1910.
2 SHEETS—SHEET 1.

WITNESSES:
A. C. Fairbanks.
J. M. Sterns.

INVENTOR.
Russell W. Magna,
BY Webster & Co.
ATTORNEYS

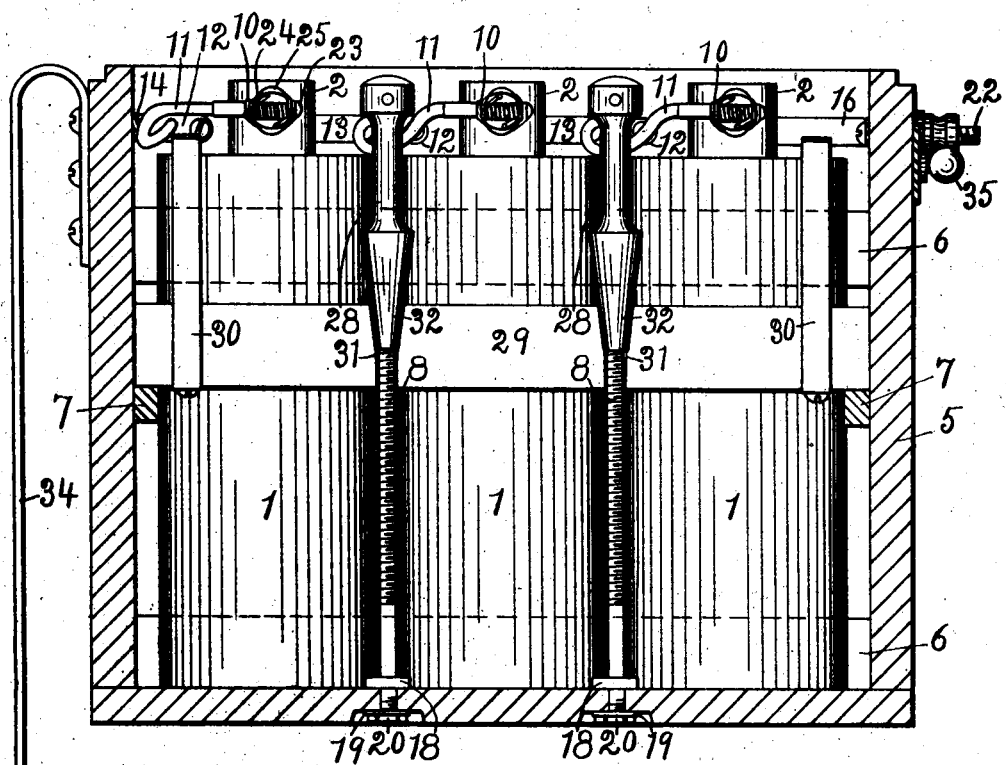
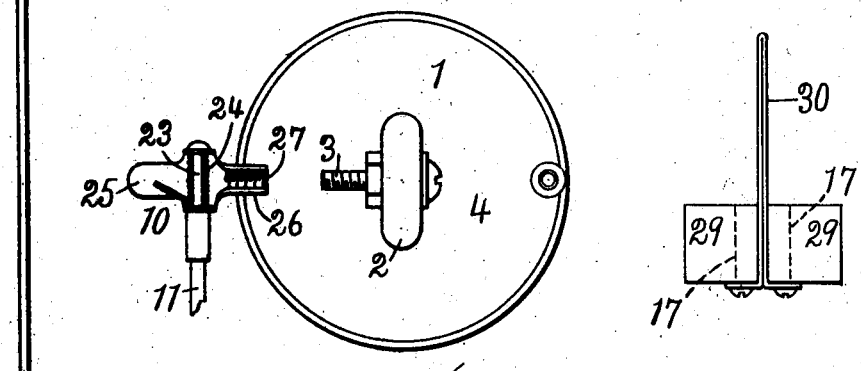
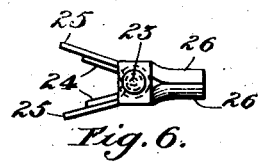

UNITED STATES PATENT OFFICE.

RUSSELL W. MAGNA, OF HOLYOKE, MASSACHUSETTS.

BATTERY-BOX.

948,111.   Specification of Letters Patent.   Patented Feb. 1, 1910.

Application filed October 1, 1908. Serial No. 455,737.

*To all whom it may concern:*

Be it known that I, RUSSELL W. MAGNA, a citizen of the United States of America, residing at Holyoke, in the county of Hampden and State of Massachusetts, have invented a new and useful Battery-Box, of which the following is a specification.

My invention relates to improvements in boxes desiged to hold a number of batteries and especially adapted for use in automobiles, and consists essentially of a box provided with connecting means for the batteries which such box is capable of containing, all as hereinafter set forth.

Heretofore the operation of replacing old and worn out batteries with new ones in the box designed to receive them has been an inconvenient and troublesome task requiring the expenditure of considerable time and labor in disconnecting the old batteries from said box and from each other and in connecting the new batteries with said box and with each other, and the primary object of my invention is to effect a great saving in both time and labor, and so appreciably to lighten such task, by producing a box equipment with the aid of which batteries can be easily, quickly, and conveniently connected in circuit in series in the usual manner, and as easily, quickly, and conveniently disconnected, such equipment being simple as well as practicable and efficient in every respect. I attain this object by the means illustrated in the accompanying drawings, in which—

Figure 1:
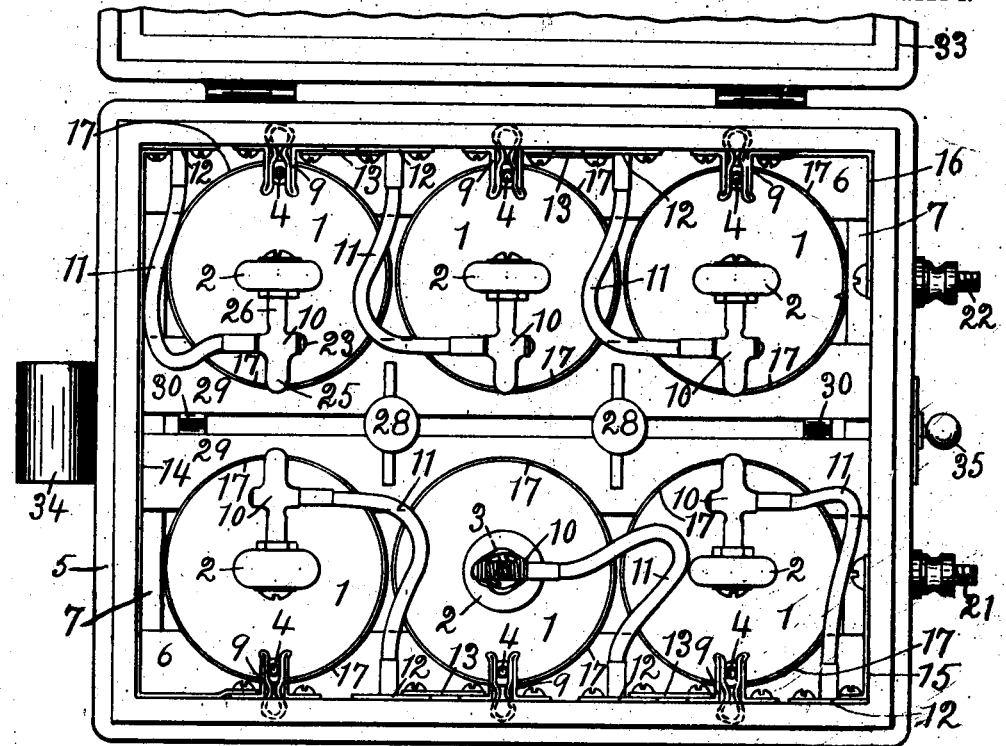
Figure 2:
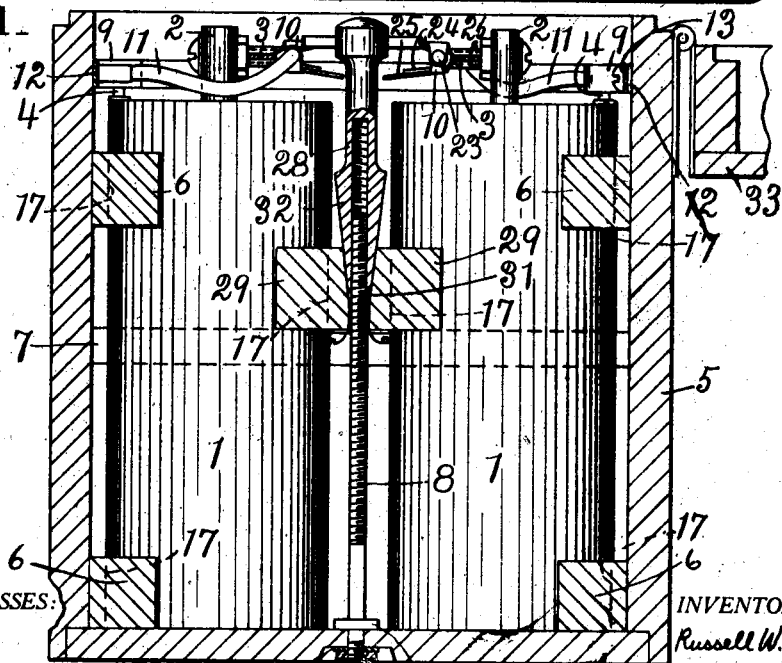

Figure 1 is a top plan view of the interior of a box in which or with which box is embodied a practical form of my invention, such view showing said invention applied to a set of batteries; Fig. 2, a cross-section taken through said box and its contents in the same plane with the vertical center of the left-hand wedge-nut, looking toward the left-hand end of the box; Fig. 3, a central, longitudinal, vertical section through the box, looking toward the back; Fig. 4, an enlarged detail of one of the snap-contacts, without one of its sides, and of one of the batteries, showing clearly the nature of the connection that can be made between the binding-post at the positive pole formed by the carbon electrode of said battery and the snap-contact; Fig. 5, an enlarged end view of the spreader, and, Fig. 6, an enlarged elevation of one of the aforesaid snap-contacts. The major portion of the lid or cover for the box is broken off in the first two views, and such cover is represented as being open in said views and assumed to be open in Fig. 3.

Similar figures refer to similar parts throughout the several views.

My invention is applicable to ordinary forms of dry batteries, it being immaterial whether the carbon electrode or positive pole binding-posts are arranged horizontally or stand vertically, or whether or not all carbon electrodes or all binding-posts are exactly of the same size. In the present case there are six batteries, four of which are alike, while one, the middle battery in the front row, has a round carbon electrode in cross-section and a vertical binding-post extending from the top thereof, and another, the left-hand battery in said row, has a thicker carbon electrode than the other flat electrodes, but is otherwise the same as the latter. The binding-posts illustrated in the drawings are of substantially the same size, although as before intimated it is not necessary so far as the invention is concerned that they be thus alike. Provision may be made for more or less than six batteries by simply changing the box and its appurtenances accordingly, and more or less than two wedge-nuts and the spindles therefor as is deemed best may be provided; these together with such other modifications and changes as fall within the scope of the appended claims being included in my invention and in no sense departing from the nature thereof.

In the drawings the batteries are represented at 1, their carbon electrodes at 2, and their binding-posts at 3 and 4, the former positive and the latter negative. The binding-posts are all screw-threaded as usual. To receive these batteries I furnish a box 5 and provide it with securing and connecting means or appliances for said batteries, which I will now proceed to describe in detail. Inside of the box 5 are four longitudinal guides or supporters 6, two transverse rests 7, two fixed, vertical, screw-threaded spindles 8, six stationary contacts 9 and the same number of movable snap-contacts 10, each of which latter is attached to one end of a short length of insulated wire 11 which has its other end attached to a fixed bracket 12, four circuit bridge pieces 13, a cross-over circuit strip 14, and two circuit corner pieces or circuit angles 15 and 16. The supporters 6, two of which are fastened in the angles between the bottom and the front and back of the box 5 and the other two against such sides above the first two, have concavities or recesses 17 therein to receive the batteries 1 and support them at these points. The rests 7 are fastened against the ends of the box below the upper pair of supporters 6. Each spindle 8 is provided just above the base with a collar 18 which bears on the floor of the box 5, and that part of said spindle which is below said collar passes through an opening in said floor to receive a washer 19 and a nut 20, beneath the floor, by means of which and the collar the spindle is securely held in a vertical position. The spindles 8 are centrally located transversely of the box.

The contacts 9, brackets 12, and bridge pieces 13 are attached to the front and back of the box 5, being evenly divided between such sides, and said contacts 9 are situated above the centers of the recesses 17 in the supporters 6. The cross-over 14 is an angular strip which extends across the left-hand end of the box on to the front and back of the same, and is attached to said end and sides. This cross-over strip connects the left-hand bracket 12 with the left-hand contact 9. The angles 15 and 16 are attached to the right-hand end and the front and back of the box and respectively connect the right-hand bracket 12 with a binding-post 21 and the right-hand contact 9 with a binding-post 22. The two remaining contacts 9 and brackets 12 on a side are connected by the bridge pieces 13. The binding-posts 21 and 22 extend through to the outside of the box, and the wires (not shown) that assist in forming the exterior portion of the circuit are attached to said binding-posts. The binding-post 21 is the positive and the binding-post 22 is the negative. Each contact 9 is made out of a strip of metal which has some degree of resiliency and is bent into suitable shape as best shown in Fig. 1, two arms, prongs, or fingers, arranged and adapted to receive between them any one of the binding-posts 4 and to grasp such post tightly so as to insure a good electrical connection, being formed at the time of bending.

The snap-contacts 10 are designed to be quickly connected with and disconnected from the binding-posts 3 of the batteries 1, as is necessary in a device of this kind. Each of these snap-contacts comprises two sections pivotally mounted on a pin 23, with a spring 24 between such sections. One terminal of each of said sections forms an ear 25, and the opposite terminal 26 is concave or semi-tubular and internally cut or screw-threaded at 27, as clearly shown in Fig. 4. The spring 24 encircles the pin 23 and is so arranged that its free terminals bear against the ears 25 to tension them apart and normally close the screw-threaded terminals or nose-pieces 26, as best shown in Fig. 6. It is these spring-pressed nose-pieces that are snapped onto any one of the binding-posts 3, which post they then grasp with an unusual degree of security and firmness due, not only to the force exerted by the spring 24, but also to the presence of the screw-threads 27, so that a good electrical connection is made and a strong connection as well. Although the snap contacts 10 are peculiarly well adapted for the purpose of easily and quickly making and breaking the carbon electrode connections, some other device might be used for the same purpose.

The spreader which I employ, in connection with two wedge-nuts 28, to bind the batteries 1 in place in the recesses 17 in the supporters 6 and so prevent said batteries from moving about in the box 5 or becoming loose even, consists of two bars 29 connected by flexible, bifurcated uprights or handles 30—30, and adapted to have its ends seated on the rests 7. In the inner or adjacent edges of the bars 29 are oppositely disposed grooves 31 positioned to accommodate the spindles 8 and having the upper portions at least of their walls tapered to receive tapered or conical body portions 32 of the wedge-nuts 28; and in the outer edges of said bars are concavities or recesses 17 which correspond relatively with the other recesses 17, that is, those in the supporters 6, and are for a similar purpose. The handles 30 not only serve to connect the bars 29, in the manner shown, but they also afford convenient means for placing the spreader in the box and for removing it therefrom. The wedge-nuts 28 are capable of being screwed onto the spindles 8 and with their tapered bodies 32 in the tapered parts of the grooves 31 to separate the bars 29. The separation of the bars 29, by the screwing down of the wedge-nuts 28, causes said bars to be forced hard against the batteries 1, and to securely hold said batteries in place between the bars and the supporters 6. A varying amount of pressure can be exerted in this way on the batteries, hence they may be retained in position with much or little force as is necessary or desirable.

A hinged cover is represented at 33, and a strap at 34 which has one end permanently attached to one end of the box on the outside and is adapted to pass over said cover when closed to fasten the same in its closed position and at the same time serve as a handle for the box 5, the other end of said strip then being temporarily attached to a knob 35 at the other end of said box on the outside.

In practice, the batteries 1 are first arranged in the box 5 with their binding-posts 4 in engagement with the contacts 9, the spreader is next introduced into said box and the wedge-nuts 28 are then placed on the spindles 8 and screwed down to separate the bars 29 as far as is necessary to firmly retain said batteries in position, and finally the snap contacts 10 are engaged with the binding-posts 3. The box circuit is now complete from the binding-post 21 to the binding-post 22, through the batteries 1 and the contacts 10 and 9, by way of the circuit members 15, 12, 11, 13, 14 and 16.

There is little or no liability, in connecting the batteries, of making any mistake, owing to the construction and arrangement of parts as herein set forth. To disconnect and release the batteries, detach the snap-contacts 10 from the binding-posts 3, unscrew and remove the wedge-nuts 28, and lift out the spreader. The batteries can now be moved so as to disengage the binding posts 4 from the contacts 9, and then lifted out of the box without difficulty.

It will be understood, of course, that each snap-contact is opened and closed by pressing together the ears 25 to separate the nose-pieces 26 of such contact, and then releasing said ears to the spring 24 which immediately causes said nose-pieces to come together again or to close on any object that may be between them, such as a binding-post.

Although I have shown and described means for conveniently and securely fastening the batteries in place in the box in a practical manner, some other equally good means may be employed.

What I claim as my invention, and desire to secure by Letters Patent, is—

1. The combination, of a battery box, a resilient contact affixed therein and capable of engaging one of the binding-posts of a battery, a bracket also fastened within said box, and a flexible connection attached at one end to said bracket and having attached to its other or free end a contact capable of engaging the other binding-post of said battery.

2. The combination, of a battery box provided at one end with binding-posts, a plurality of stationary and movable contacts within such box, such contacts being capable of engaging the binding-posts of the batteries contained in the box, circuit corner pieces between the binding-posts of the box and the stationary and movable contact members at this end of the box, and a cross-over circuit strip between the stationary and movable contact members at the opposite end of the box.

3. The combination, in a battery box, with a stationary contact in the box, of a snap-contact comprising pivotally-connected members having concave nose-pieces which are interiorly cut to engage the screw-threads of a binding-post, the axis of such nose-pieces being at right-angles to the axis of the pivotal connection, and a flexible connection between said box and said snap-contact.

RUSSELL W. MAGNA.

Witnesses:
F. A. CUTTER,
A. C. FAIRBANKS.